United States Patent
Wysocki et al.

(10) Patent No.: US 6,556,340 B1
(45) Date of Patent: Apr. 29, 2003

(54) OPTICAL AMPLIFIERS AND UPGRADE MODULES

(75) Inventors: Paul F. Wysocki, Flemington, NJ (US); William S. Wong, San Jose, CA (US)

(73) Assignee: Onetta, Inc., Sunnyvale, CA (US)

(*) Notice: Subject to any disclaimer, the term of this patent is extended or adjusted under 35 U.S.C. 154(b) by 0 days.

(21) Appl. No.: 09/851,379

(22) Filed: May 9, 2001

Related U.S. Application Data

(60) Provisional application No. 60/281,775, filed on Apr. 6, 2001.

(51) Int. Cl.[7] .................................................. H01S 3/00
(52) U.S. Cl. ...................................................... 359/334
(58) Field of Search ............................... 359/334, 341.1, 359/333, 349

(56) References Cited

U.S. PATENT DOCUMENTS

| | | | | |
|---|---|---|---|---|
| 4,995,696 A | * | 2/1991 | Nishimura et al. .......... 359/333 |
| 5,579,154 A | * | 11/1996 | Mueller-Fiedler et al. .................... 359/341.1 |
| 5,646,775 A | * | 7/1997 | Delrosso et al. .......... 359/341.1 |
| 5,661,835 A | * | 8/1997 | Kato et al. ...................... 385/33 |
| 5,694,238 A | * | 12/1997 | Lausen et al. .............. 359/160 |
| 5,703,990 A | * | 12/1997 | Robertson et al. .......... 359/341.1 |
| 5,726,796 A | * | 3/1998 | Regener et al. ............. 359/163 |
| 5,778,132 A | | 7/1998 | Csipkes et al. ............. 385/135 |
| 5,859,938 A | * | 1/1999 | Nabeyama et al. ............. 372/6 |
| 5,917,648 A | * | 6/1999 | Harker ....................... 359/334 |
| 5,959,750 A | | 9/1999 | Eskildsen et al. .......... 359/134 |
| 6,018,405 A | * | 1/2000 | Tomooka et al. ........... 359/110 |
| 6,169,615 B1 | * | 1/2001 | Shirai ......................... 359/110 |
| 6,215,582 B1 | * | 4/2001 | Sudo et al. ................. 385/134 |
| 6,236,498 B1 | * | 5/2001 | Freeman et al. ............ 359/124 |
| 6,236,499 B1 | | 5/2001 | Berg et al. .................. 359/341 |
| 6,272,154 B1 | * | 8/2001 | Bala et al. .................. 359/127 |
| 6,275,331 B1 | | 8/2001 | Jones et al. ............. 359/341.44 |
| 6,304,370 B1 | * | 10/2001 | Barnard ................... 623/22.21 |
| 6,310,716 B1 | * | 10/2001 | Evans et al. ................ 359/124 |
| 6,310,717 B1 | * | 10/2001 | Naganuma et al. ....... 359/341.1 |
| 6,313,938 B1 | * | 11/2001 | Shikii et al. ................ 359/333 |
| 6,334,020 B1 | * | 12/2001 | Fujimori et al. ............ 385/134 |
| 6,384,961 B2 | * | 5/2002 | Lawrence ................... 359/333 |
| 6,411,407 B1 | * | 6/2002 | Maxham ..................... 359/110 |
| 6,417,959 B1 | * | 7/2002 | Bolshtyansky et al. ..... 359/334 |
| 6,424,440 B1 | * | 7/2002 | Shimomura et al. ........ 359/127 |
| 6,424,459 B1 | * | 7/2002 | Yokota .................. 359/341.42 |
| 2001/0033411 A1 | * | 10/2001 | Shiota et al. ............... 359/333 |

FOREIGN PATENT DOCUMENTS

EP  0 734 105 A2  9/1996  ............. H01S/3/06

OTHER PUBLICATIONS

Sun et al. "Optical Fiber Amplifiers for WDM Optical Networks" Bell Labs Journal, p. 187–206, Jan.–Mar., 1999.

* cited by examiner

Primary Examiner—Thomas G. Black
Assistant Examiner—Deandra M. Hughes
(74) Attorney, Agent, or Firm—Fish & Neave; G. Victor Treyz

(57) ABSTRACT

Optical amplifiers and upgrade modules for the optical amplifier are provided. The optical amplifiers and upgrade modules may be used to amplify optical signals in fiber-optic communications networks. Optical gain may be produced by erbium-doped fiber amplifier stages and Raman amplifier arrangements. When an upgrade module is used to upgrade an amplifier, the light that is provided to the upgraded amplifier may be routed through optical components in the upgrade module. The upgrade module may be used to expand the optical bandwidth of the amplifier or to add Raman preamplification capabilities. When the upgrade module is used to add Raman gain, erbium-doped fiber that was used in the amplifier prior to upgrading may be removed from the optical path during the upgrade process to help maintain the desired spectral shape for the upgraded amplifier. Dynamic and passive filters may also be used to help maintain a desired spectral shape. Hot upgrades may be performed using the amplifiers and upgrade modules.

19 Claims, 12 Drawing Sheets

OPTICAL AMPLIFIERS AND UPGRADE MODULES

This application claims the benefit of provisional patent application No. 60/281,775, filed Apr. 6, 2001.

BACKGROUND OF THE INVENTION

The present invention relates to equipment for fiber-optic communications networks, and more particularly, to optical amplifiers and equipment for upgrading optical amplifiers.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. Typical optical amplifiers are based on erbium-doped fiber coils that are pumped with diodes lasers. Amplifiers may be designed to operate in the C-band (1527–1563 nm) or the L-band (1565–1605 nm). Raman amplifier arrangements may be used to amplify light in transmission fiber spans.

It is an object of the present invention to provide systems based on optical amplifiers and modules for upgrading the optical amplifiers.

SUMMARY OF THE INVENTION

This and other objects of the invention are accomplished in accordance with the present invention by providing optical amplifiers with upgrade modules. The amplifiers may be used to amplify optical signals on optical communications links in fiber-optic communications systems. The upgrade modules may be used to add features to the optical amplifiers. For example, the upgrade modules may be used to add Raman amplification capabilities to the optical amplifiers or may be used to expand the optical bandwidth that is handled by the optical amplifiers.

Further features of the invention and its nature and various advantages will be more apparent from the accompanying drawings and the following detailed description of the preferred embodiments.

DETAILED DESCRIPTION OF THE PREFERRED EMBODIMENTS

The upgradable and upgraded optical amplifiers of the present invention may be used as stand-alone equipment or may be incorporated into other equipment such as transmitters, receivers, add/drop modules, dispersion compensation modules, and optical switches. For illustrative purposes, aspects of the present invention are primarily described in the context of stand-alone optical amplifiers, but this is merely illustrative.

Figure 1:
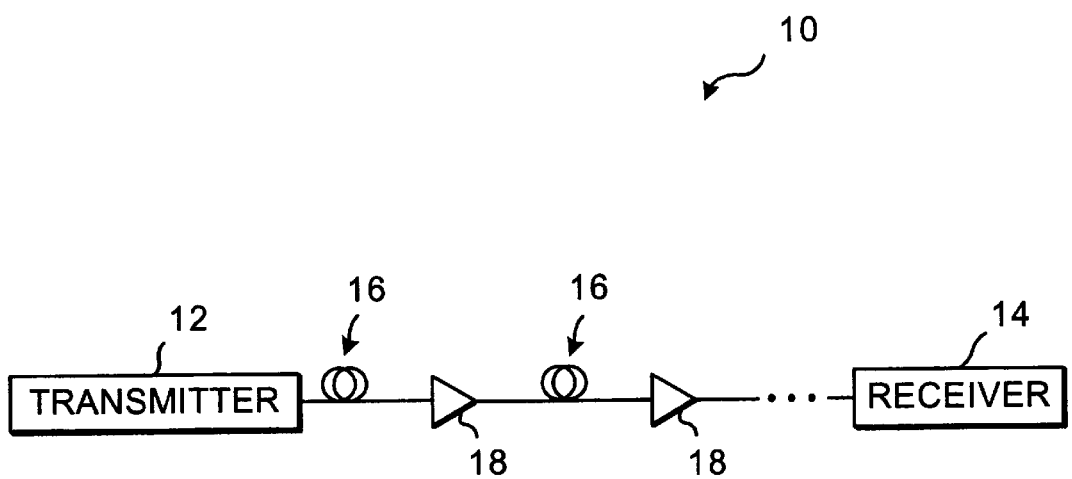
FIG. 1 is a schematic diagram of an illustrative fiber-optic communications link including optical amplifiers in accordance with the present invention.

An illustrative fiber-optic communications link 10 in an optical communications network is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., wavelengths in the range of 1240–1650 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers. For clarity, the present invention will sometimes be described in the context of optically-pumped erbium-doped fiber amplifiers. This is, however, merely illustrative.

Link 10 may include other optical network equipment such as add/drop modules, optical switches, dispersion compensation modules, dynamic filter modules, or any other suitable optical network equipment.

Figure 2:
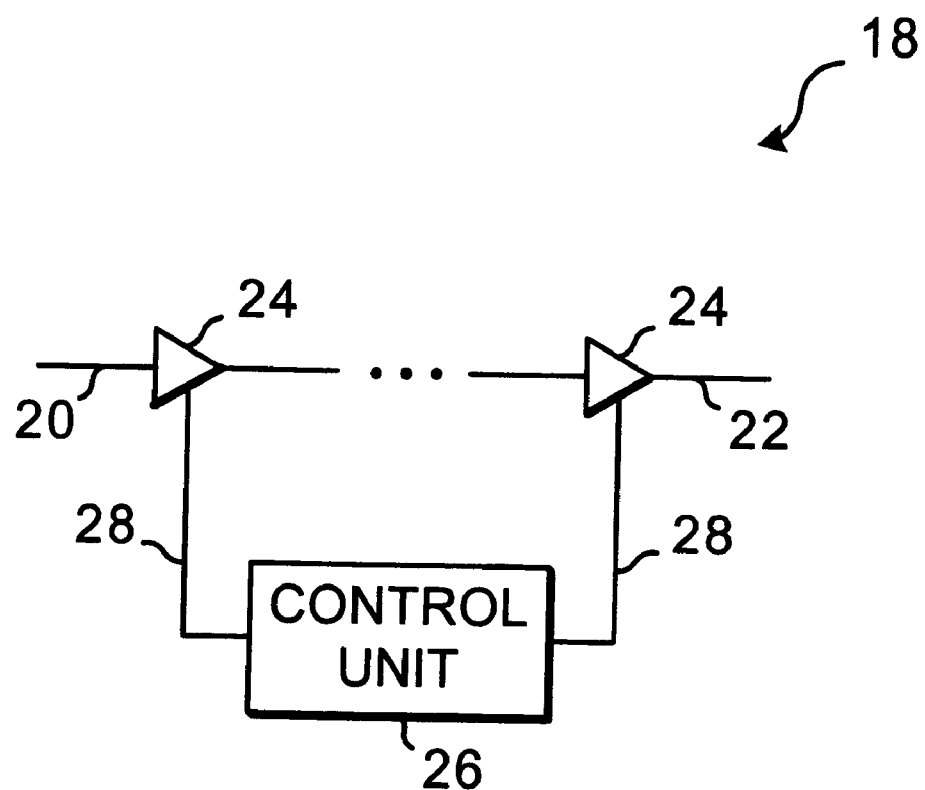
FIG. 2 is a schematic diagram of an illustrative optical amplifier in accordance with the present invention.

An illustrative optical amplifier 18 is shown in FIG. 2. Optical signals to be amplified (e.g., light from a span of transmission fiber 16 in link 10) may be provided to fiber input 20. Corresponding output signals that have been amplified by amplifier 18 may be provided at fiber output 22.

Optical gain may be provided by one or more gain stages 24. Gain stages 24 may be based on optically-pumped rare-earth-doped fiber such as erbium-doped fiber, Raman-pumped fiber, semiconductor optical amplifiers devices, or any other suitable components for providing optical gain. Amplifier 18 may have one stage, two stages, or more than two stages if desired. The operation of the pumps and other equipment in stages 24 may be controlled by a control unit 26 using paths 28. Control unit 26 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Figure 3:
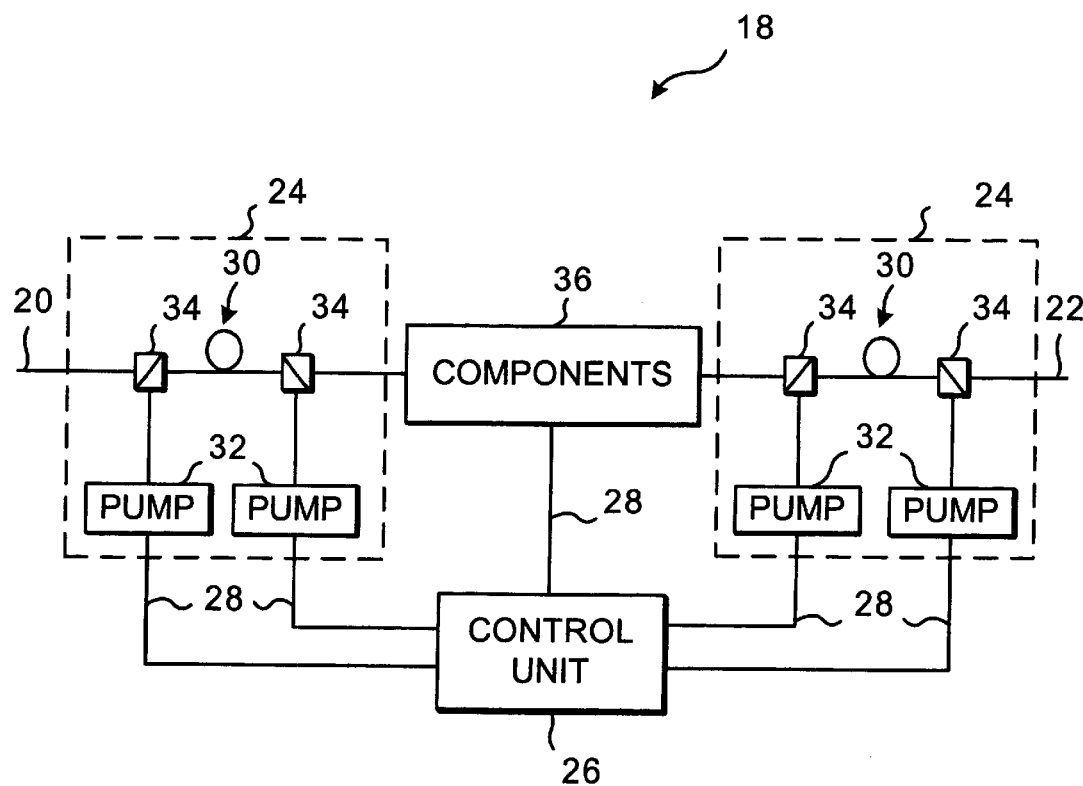
FIG. 3 is a more detailed schematic diagram of an illustrative optical amplifier in accordance with the present invention.

A more detailed diagram of an illustrative optical amplifier 18 is shown in FIG. 3. In the example of FIG. 3, gain stages 24 include erbium-doped fiber coils 30. Fiber 30 may be optically pumped by pumps 32. Pumps 32 may be one or more laser diode pumps operating at wavelengths of 980 nm or 1480 nm or other suitable wavelengths or any other suitable sources of pump light. Pumps 32 and components 36 may be controlled by control unit 26 using paths 28. Light from pumps 32 may be directed into coils 30 through pump couplers 34. Pump couplers 34 may be wavelength-division-multiplexing (WDM) couplers or any other suitable pump couplers. The pumping arrangement of FIG. 3 uses copumping and counterpumping. This is merely illustrative. Fiber coils such as coils 32 may be only copumped or may be only counterpumped if desired.

The illustrative amplifier 18 in FIG. 3 is somewhat simplified to avoid over-complicating the drawing. In general, amplifier 18 and the other network equipment in link 10 may have components 36 such as taps for optical monitoring, filters such as passive and dynamic optical filters, wavelength-division-multiplexing couplers, circulators, isolators, attenuators, dispersion-compensating elements, etc. Components 36 may be located at any suitable positions along the fiber path in amplifier 18. Components 36 are shown in a midstage location in the arrangement of FIG. 3 for purposes of illustration.

Amplifiers 18 such as amplifier 18 of FIGS. 2 and 3 may be provided with upgrade capabilities. For example, amplifiers 18 may be upgraded to support a wider optical bandwidth, may be upgraded to support dynamic gain equalization and optical channel monitoring features, may be upgraded to support discrete or distributed Raman amplification, or may be upgraded to support any other suitable optical network equipment features.

Figure 4A:
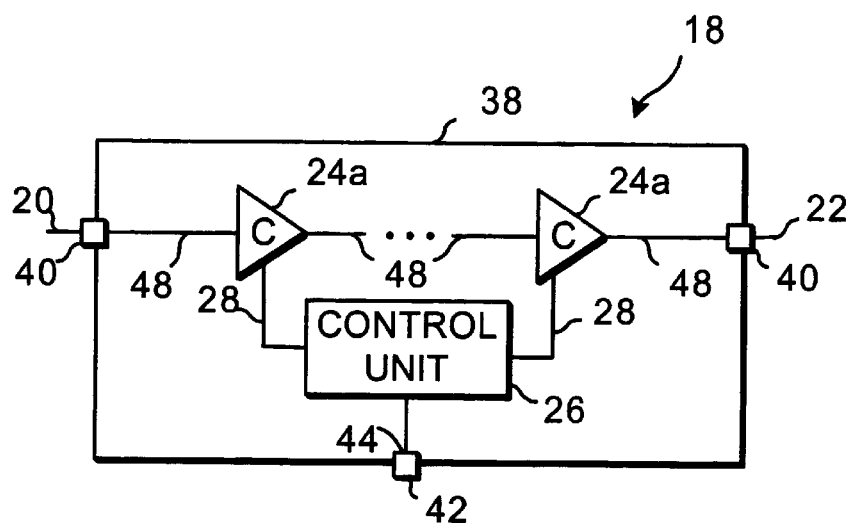
FIG. 4a is a schematic diagram of an illustrative optical amplifier that may be upgraded in accordance with the present invention.

An illustrative upgradable amplifier 18 is shown in FIG. 4a. As shown in FIG. 4a, amplifiers 18 may have housings such as housing 38. Housing 38 may be a metal housing in which a number of circuit boards and optical assemblies are mounted. Optical connectors 40 may be provided to facilitate the optical interconnection of amplifiers 18 with other equipment in the network such as upgrade modules. Connectors 40 may be connectors such as FC/APC (angle polished) connectors or other suitable reusable connectors. Connectors 40 may be mounted as bulkhead connectors in housing such as housing 38 or may be provided on the ends of fiber pigtails or at any other suitable location on the fibers of a given amplifier 18. Wherever connectors 40 are shown in the drawings, bare fiber pigtails or any other suitable fiber may be provided instead of connectors 40 if desired. Such fiber may be spliced into use in network equipment using a fusion splicer or other suitable equipment.

Figure 4B:
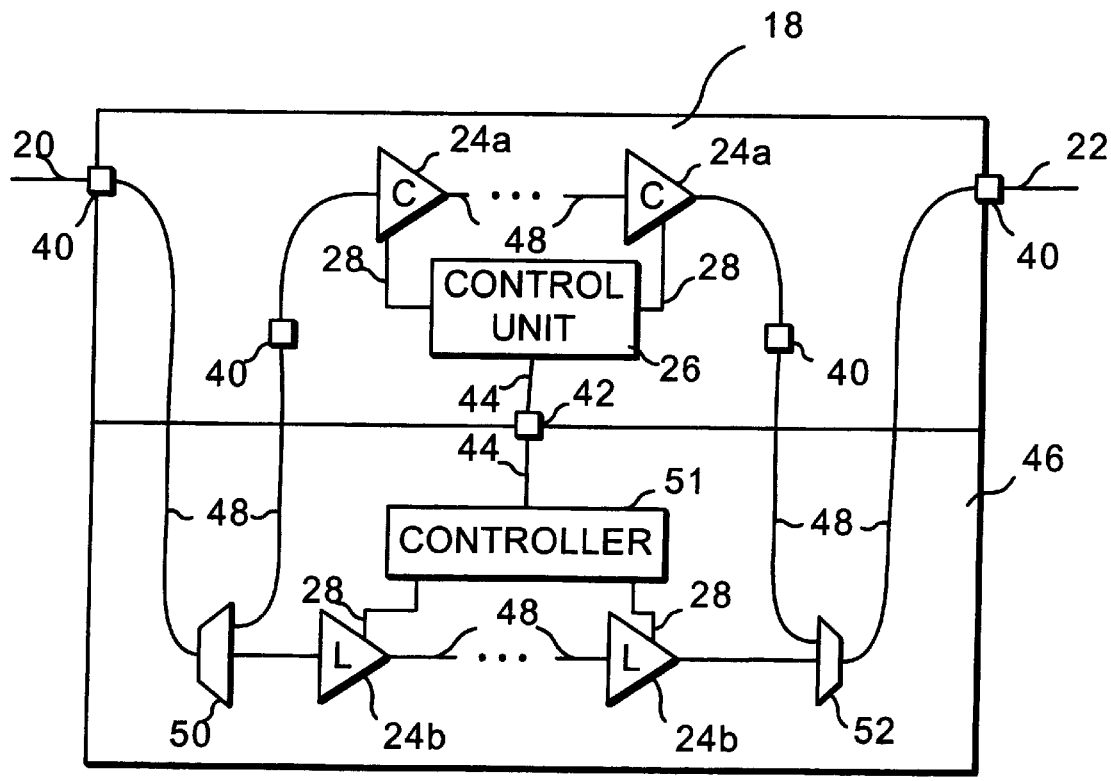
FIG. 4b is a schematic diagram of the illustrative optical amplifier of FIG. 4a with an associated upgrade module in accordance with the present invention.

The non-electrical paths in the drawings such as paths 48 in FIGS. 4a and 4b may be fiber paths. Such fiber paths may include fiber pigtails (e.g., at the exit or entrance to a housing) and may include fiber lengths from one module or piece of equipment that are connected to another module or piece of equipment using a housing pass-through or bulkhead fixture. Fiber connections may be rearranged when a module is added by making fiber cuts and resplicing the cut fibers and other fibers with the fibers in the new equipment or by disconnecting fiber connectors 40 and reconnecting some or all of connectors 40 to connectors 40 in the new equipment. Both fiber connectors 40 and fiber splices may be used together to interconnect optical amplifiers and other such equipment with upgrade modules.

Amplifier 18 may have electrical connectors such as electrical connector 42. Electrical connector 42 may be mounted to housing 38 and may be electrically connected to control unit 26 by path 44. Connector 42 may also be provided on the end of a flexible wire or cable. Connector 42 may include one or more jacks, plugs, or any other suitable connectors.

Optical gain may be provided by optically-pumped erbium-doped-fiber amplifier stages 24. Stages 24a of FIG. 4a may be C-band stages operating in the wavelength range of about 1527–1563 nm. It may be desired to upgrade amplifier 18 of FIG. 4a during manufacturing or in the field (e.g., after amplifier 18 has been installed in a network). Accordingly, an upgrade module 46 may be provided that may be optically and electrically connected to amplifier 18 as shown in FIG. 4b.

In the example of FIG. 4b, upgrade module 46 contains L-band gain stages 24b that provide amplification for signals in the L-band (about 1565–1605 nm). The operation of the pumps and other components of L-band stages 24b and the other components of module 46 may be controlled by controller 51 using electrical paths 28. Upgrade module controllers such as controller 51 of FIG. 4b may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Controller 51 and control unit 26 may be interconnected using paths 44 and connector 42. Controller 51 and control unit 26 may communicate using digital communications, analog communications, or a combination of digital and analog communications. Any suitable communications format may be used. For example, controller 51 and control unit 26 may support serial communications, parallel communications, communications over a RS-232 interface, Ethernet communications, or any other suitable protocols.

The L-band stages 24b of module 46 may be optically interconnected with the optical path of amplifier 18 using fiber paths 48. Some of the fiber paths 48 may be provided using fiber pigtails and are illustrated in FIG. 4b as protruding into and out of amplifier 18 and module 46. If desired, some or all of the optical connections between amplifier 18 and module 46 may be provided using connectors that are integrated into the housings of amplifier 18 and module 46.

After amplifier equipment 18 and upgrade equipment 46 have been joined (e.g., mechanically, optically, and electrically), optical signals may be routed from fiber input 20 to fiber output 22. With the combined C-band and L-band equipment arrangement of FIG. 4b, C-band light that is provided to input 20 is routed through the gain stages 24a of amplifier 18 by demultiplexer 50. Demultiplexer 50 also routes L-band light through L-band stages 24b in module 46. Amplified C-band light from stages 24a in amplifier 18 and amplified L-band light from stages 24b in module 46 may be combined into the same fiber path 48 using optical multiplexer 52.

Figure 5A:
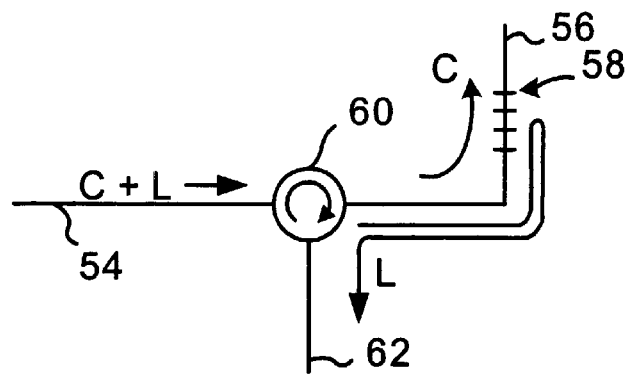
FIGS. 5a, 5b, and 5c are diagrams of illustrative configurations that may be used for optical multiplexers and demultiplexers in accordance with the present invention.
Figure 5B:
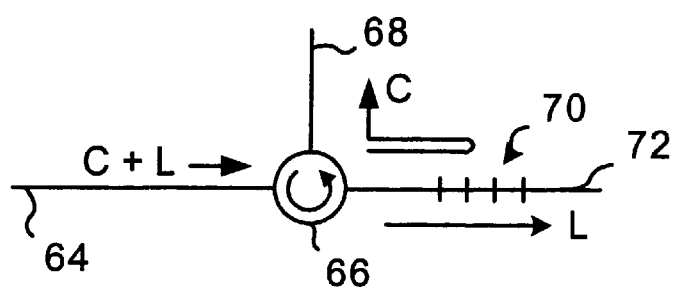
Figure 5C:
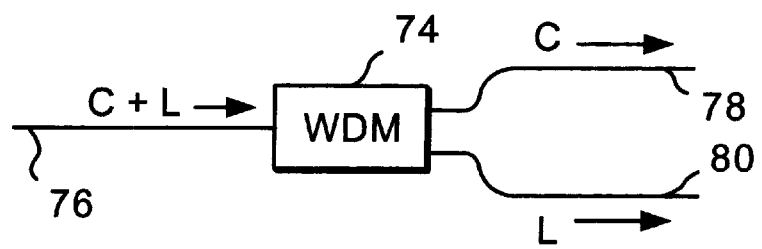

Optical demultiplexers and multiplexers such as demultiplexer 50 and multiplexer 52 of FIG. 4b may be based on any suitable components for separating and combining different wavelengths of light. Several illustrative demultiplexer and multiplexer arrangements are shown in FIGS. 5a, 5b, and 5c. In FIGS. 5a, 5b, and 5c, arrows depict the direction of light propagation for use of the components as demultiplexers. When the components of these FIGS. are used as multiplexers, the arrows on the circulators and the arrows marking the directions of light propagation should be reversed.

In the arrangement of FIG. 5a, C-band and L-band light may be provided at input 54. Circulator 60 may direct this light to fiber Bragg grating 58. Grating 58 may pass C-band light to output port 56 and may reflect L-band light. Circulator 60 may direct the reflected L-band light to output 62.

In the arrangement of FIG. 5b, C-band and L-band light may be directed to fiber Bragg grating 70 by circulator 66 via input 64. Fiber Bragg grating 70 in FIG. 5b may reflect the C-band light back through circulator 66 to fiber output 68. L-band light may be passed to output 72.

In the arrangement of FIG. 5c, a wavelength-division-multiplexing coupler 74 may be used to split C-band and L-band light that is provided at input 76 into C-band output path 78 and L-band output path 80.

The approach described in connection with FIGS. 4a and 4b allows C-band amplifier 18 of FIG. 4a to be provided with an upgrade module 46 to add L-band stages 24b. In operation in a network, C-band and L-band signals may be provided to input 20 of the upgraded amplifier of FIG. 4b and corresponding amplified C-band and L-band output signals may be provided at output 22. The C-band signals may be amplified by the C-band stages 24a in amplifier portion 18 and the L-band signals may be amplified by the L-band stages 24b in upgrade equipment 46.

Control unit 26 and controller 51 may communicate to coordinate the operation of amplifier 18 and the amplifier stages in module 46. Control unit 26 may receive instructions (e.g., desired gain settings or other amplifier settings) from a network management system over an electrical or optical communications path such as a path that includes a service channel or other dedicated network communications path. These settings may be used by control unit 26 to adjust the operation of amplifier 18. Information on the settings may also be provided to controller 51 for controlling the operation of module 46. This approach may be used whenever an upgrade module is used to upgrade an amplifier or other network equipment.

With an upgrade arrangement of the type shown in FIGS. 4a and 4b, additional optical bandwidth (e.g., L-band bandwidth) may be added to amplifier 18. Another type of upgrade that may be made to an amplifier involves adding Raman amplification capabilities. The Raman amplification capabilities may be provided in the form of an upgrade module that provides Raman pump light for pumping the span of transmission fiber 16 in link 10 that precedes a given amplifier 18. This Raman pumping creates Raman gain in the transmission fiber through stimulated Raman scattering. The Raman gain improves system performance.

Figure 6A:
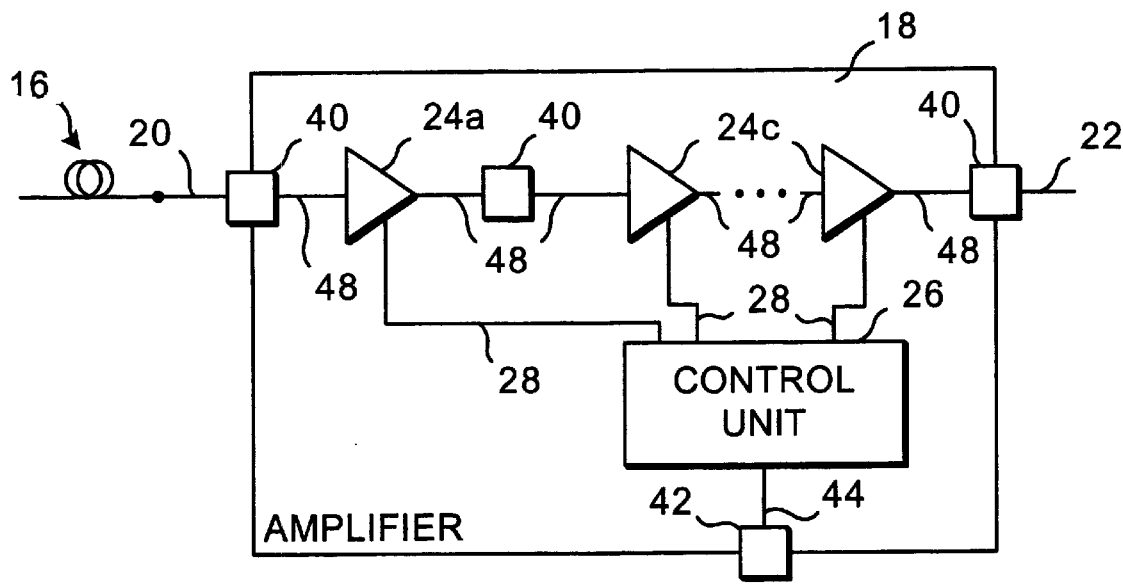
FIG. 6a is a schematic diagram of an illustrative optical amplifier having a preamplifier stage that may be bypassed in accordance with the present invention.
Figure 6B:
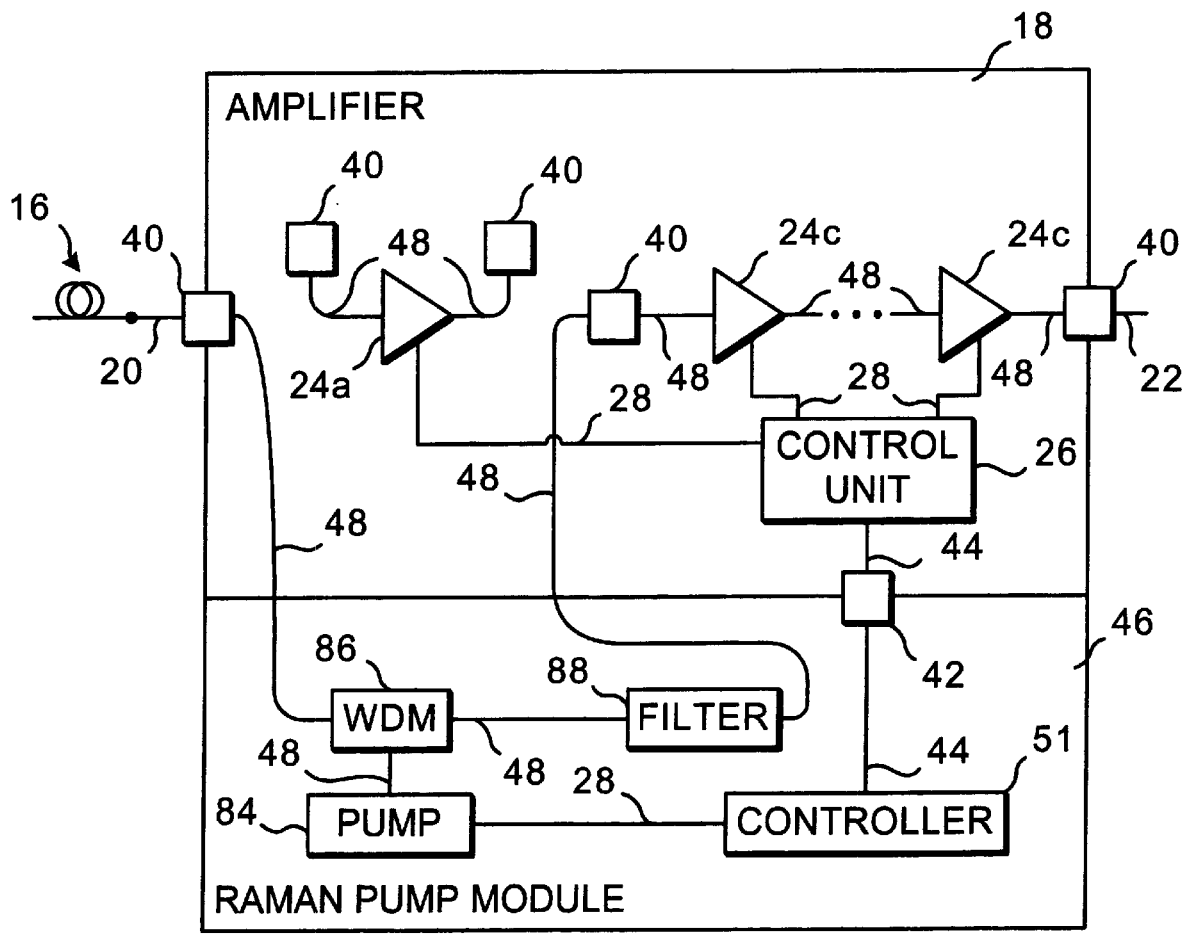
FIG. 6b is a schematic diagram of the illustrative optical amplifier of FIG. 8a with an upgrade module and a bypassed preamplifier stage in accordance with the present invention.

An example of this type of arrangement is shown in FIGS. 6a and 6b. In the illustrative example of FIG. 6a, amplifier 18 has an input 20 and output 22. Gain stages 24a and 24c may be, for example, rare-earth-doped fiber amplifier stages such as erbium-doped fiber amplifier stages. The stages and other components in amplifier 18 may be controlled by control unit 26 using paths 28. Path 44 may be used to connect control unit 26 to an electrical connector 42. If desired, connectors such as connector 42 of FIG. 6a may be omitted from the amplifiers 18 and modules 46 and interconnections may instead be formed between pieces of equipment using soldering or other suitable techniques. Fiber such as fiber 48 may be used to optically interconnect components in amplifiers 18. Optional optical connectors 40 may be used to facilitate the reconfiguration of amplifiers 18 (e.g., during upgrades).

The amplifier 18 of FIG. 6a and some of the other amplifiers 18 are shown as having at least three gain stages, but this is merely illustrative. In general, amplifiers 18 may have any suitable number of stages.

In FIG. 6a, the input 20 of amplifier 18 is shown as being connected to fiber span 16. Initially, span 16 may be unpumped. When it is desired to add Raman pumping to fiber span 16, Raman upgrade module 46 may be added to amplifier 18 as shown in FIG. 6b. Pump module 46 may include a controller 51 for controlling the operation of the components of module 46. Controller 51 may communicate with control unit 26 over paths 44 and connector 42.

Raman pump 84 may be used to provide Raman pump light for the transmission fiber 16 that is connected to input 20. Pump 84 may include one or more laser diodes or other suitable sources of pump light. Pump light from pump 84 may be coupled into span 16 through wavelength-division-multiplexing coupler 86 or other suitable pump coupler. Coupler 86 directs pump light in the backwards direction along span 16 and allows data signals from span 16 that are provided at input 20 to pass in the forwards direction through the upgraded amplifier towards output 22.

In the upgraded amplifier arrangement of amplifier 18 and module 46 in FIG. 6b, Raman pump light is provided to span 16. This creates distributed gain in span 16 that increases the input power provided to amplifier 18 at input 20. To accommodate this increase in input power, one or more stages or portions of amplifier 18 may be bypassed in the upgraded amplifier.

In the example of FIG. 6b, first amplifier stage 24a has been bypassed and optical signals from input 20 have been directed through coupler 86 to second stage 24c. The Raman preamplifier stage formed by Raman pumping span 16 with pump 84 performs the amplification functions that were performed by the erbium-doped fiber in stage 24a in amplifier 18 before upgrade module 46 was added. Bypassing the erbium-doped fiber in stage 24a may help to maintain the average inversion level of the remaining erbium-doped fiber at an appropriate level, even though the input power provided to input 20 has been increased. Control unit 26 may also adjust the powers of the pumps in the gain stages to control the inversion level.

An optional filter 88 may be used to modify the spectrum of the optical data signals exiting wavelength division multiplexer coupler 48. Filter 88 may be used to help ensure that the upgraded amplifier formed from the Raman gain stage of module 46 and the gain stages 24c of amplifier 18 has desired gain spectrum characteristics. Gain stage 24a may also include a spectral filter. If stage 24a includes a filter, this filter will be omitted from the main fiber path through the amplifier when stage 24a is bypassed, which changes the gain spectrum of the amplifier.

Figure 7A:
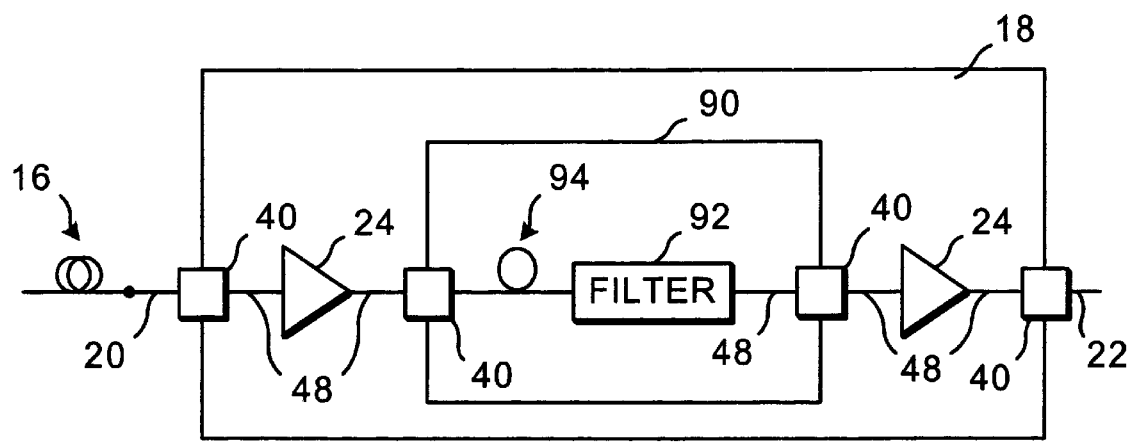
FIG. 7a is a schematic diagram of an illustrative optical amplifier with a replaceable midstage module in accordance with the present invention.
Figure 7B:
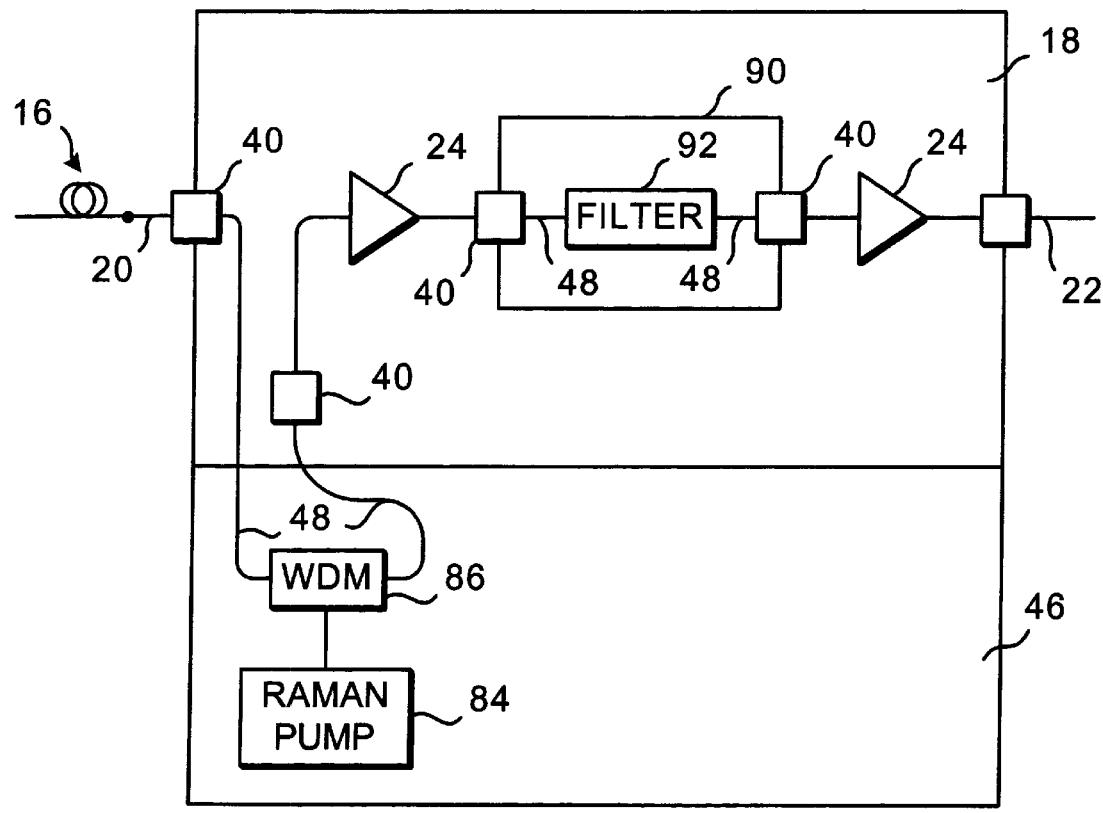
FIG. 7b is a schematic diagram of the illustrative optical amplifier of FIG. 7a with a different midstage module and an associated upgrade module in accordance with the present invention.

Another Raman upgrade arrangement is shown in FIGS. 7a and 7b. In the example of FIGS. 7a and 7b, amplifier 18 has a midstage module or portion 90. When amplifier 18 is used without distributed Raman preamplification, a version of module 90 may be used that includes a first filter 92 and a length of erbium-doped fiber 94. Modules 90 may also include dispersion-compensating fiber and other components. Fiber 94 may be unpumped or may be pumped. If fiber 94 is pumped, pump light may be provided using a pump in module 90 or may be pumped using excess pump light provided from a pump in one of stages 24. For example, pump light exiting the first stage 24 in FIG. 7a in the forwards direction may be used to pump fiber 94.

When it is desired to add Raman amplification capabilities to amplifier 18, upgrade module 46 may be added to amplifier 18, as shown in FIG. 7b. The control electronics of amplifier 18 of FIG. 7a and upgrade module 46 of FIG. 7b may be provided using the arrangement of shown in FIGS. 4a and 4b.

Module 46 may have a Raman pump 84 for pumping transmission fiber span 16 to produce Raman gain. Pump light from pump 84 may be coupled into fiber 16 using wavelength-division-multiplexing coupler 86. Raman pump module 46 may be connected in the fiber path before the first stage 24 of amplifier 18, as shown in FIG. 7b. The Raman pump light produces Raman gain in span 16, which increases the input power to the first stage 24 in amplifier 18.

To accommodate this increase in input power, a new module or portion 90 may be installed in amplifier 18 as part of the upgrade process. The new module 90 may include a filter 92 that is the same as filter 92 in FIG. 7a or that is different than the filter 92 in FIG. 7a. The shape of the filter may be selected to ensure that the upgraded amplifier produces a desired gain spectrum. The length of erbium-doped fiber 94 may be adjusted, or may be omitted from module 90 completely as shown in FIG. 7b. The erbium-doped-fiber length adjustment that is produced by replacing module 90 of FIG. 7a with module 90 of FIG. 7b may help the combined amplifier formed from amplifier 18 and module 46 to produce an acceptable gain spectrum. The gain spectrum produced by the upgraded amplifier may, for example, be configured to be similar to or the same as the gain spectrum of amplifier 18 of FIG. 7a.

Shortening the length of the erbium-doped fiber in the upgraded amplifier relative to the length of the erbium-doped fiber in the amplifier before upgrading may help the amplifier maintain a fairly constant inversion level and fairly constant spectral properties (e.g., fairly constant gain tilt), even after the input power provided to input 20 changes when the upgrade module 46 is attached to amplifier 18 and the Raman amplifier gain stage is placed in use.

Figure 8A:
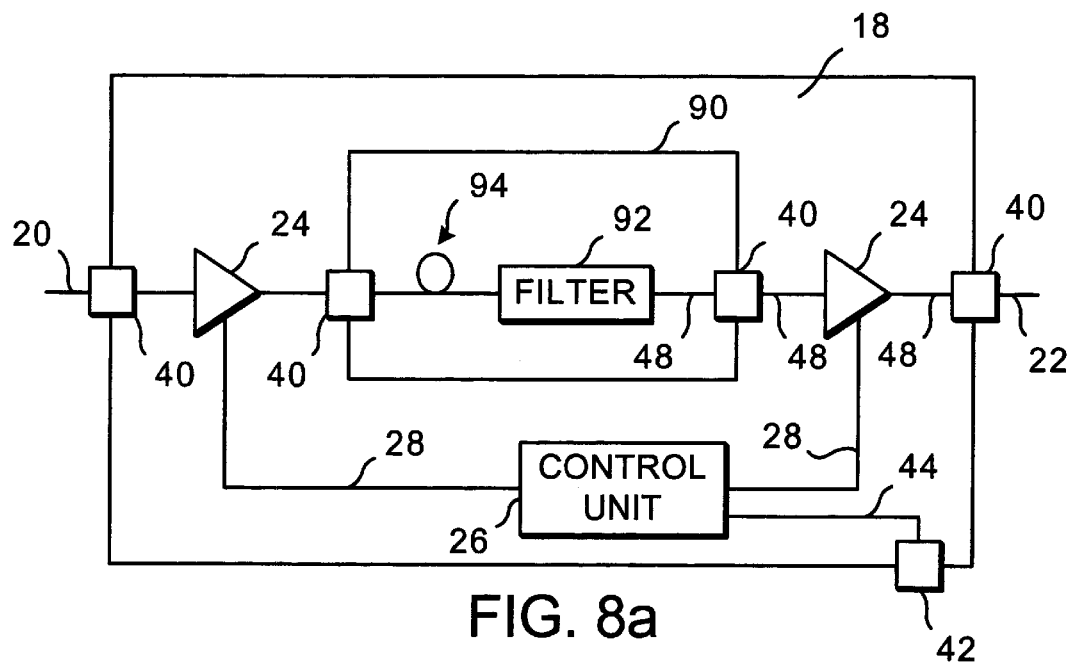
FIG. 8a is a schematic diagram of an illustrative optical amplifier having a removable midstage module in accordance with the present invention.
Figure 8B:
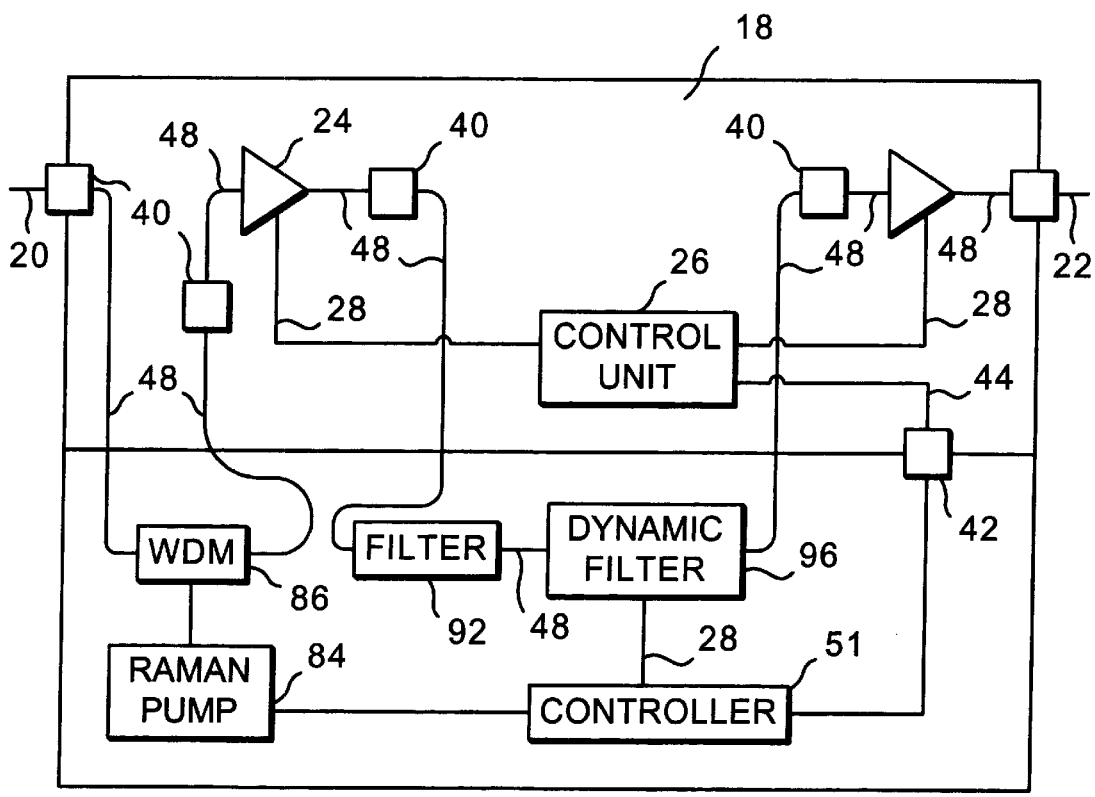
FIG. 8b is a schematic diagram of the illustrative optical amplifier of FIG. 8a with an upgrade module in accordance with the present invention.

If desired, amplifier 18 may be upgraded to include dynamic gain equalization capabilities using an upgrade module 46 with a dynamic filter. An arrangement of this type is shown in FIGS. 8a and 8b. Amplifier 18 of FIG. 8a has gain stages 24 and a module or portion 90 having a length of erbium-doped fiber 94 and a spectral filter 92. Filter 92 may be used to help flatten or otherwise shape the gain spectrum of amplifier 18. Filters 92 of FIG. 8a and the other FIGS. may be thin film filters, filters based on fiber Bragg gratings, or any other suitable filters.

Modules such as module 90 of FIG. 8a may be removable. Removal of a module 90 may be facilitated using connectors 40. Connectors 40 of module 90 may be bulkhead connectors on the housing of module 90, may be connectors on the end of fiber pigtails, or may be omitted and replaced by fiber splices. Using connectors 40 for module 90 may help facilitate the removal of module 90 in the field when an upgrade is being performed by a technician.

As shown in FIG. 8b, upgrade module 46 may include a dynamic spectral filter 96. A static filter such as filter 92 may be placed in series with dynamic filter 96 to help reduce the dynamic range requirements of filter 96. Filter 92 and dynamic filter 96 may be optically connected to the same connectors that were used to connect module 90 into the fiber path of amplifier 18. This type of midstage configuration may be desirable for reducing noise penalties associated with the insertion loss of dynamic filter 96. If desired, dynamic filter 96 may be inserted into the fiber path of amplifier 18 at any other suitable location.

Upgrade module 46 may have a Raman pump 84 and a coupler 86 for coupling pump light from pump 84 into the preceding span of transmission fiber 16. The Raman pump components of module 46 may be connected to amplifier 18 using connectors 40, fiber splices, or any other suitable arrangement.

Controller 51 of module 46 may be connected to control unit 26 of amplifier 18 using paths 44 and electrical connector 42. When module 46 is added to amplifier 18, control unit 26 may be provided with new software for controlling filter 96. If desired, an optical channel monitor may be provided in upgrade module 46 for measuring the spectrum of the light in the fiber path in amplifier 18. External optical channel monitors may also be used. Spectral information from external monitors may be provided to control unit 26 over an electrical path connected to control unit 26.

Removing erbium-doped fiber length 94 from amplifier 18 when the components of module 90 of FIG. 8a are replaced with the filter arrangement of module 46 in FIG. 8b helps to reduce the amount of gain tilt that is introduced by the increase in input power to input 20 that results from the introduction of the Raman gain in fiber 16. If desired, length 94 may be omitted from module 90. Moreover, the components of module 90 need not be removed from amplifier 18 when amplifier 18 is upgraded.

Figure 9A:
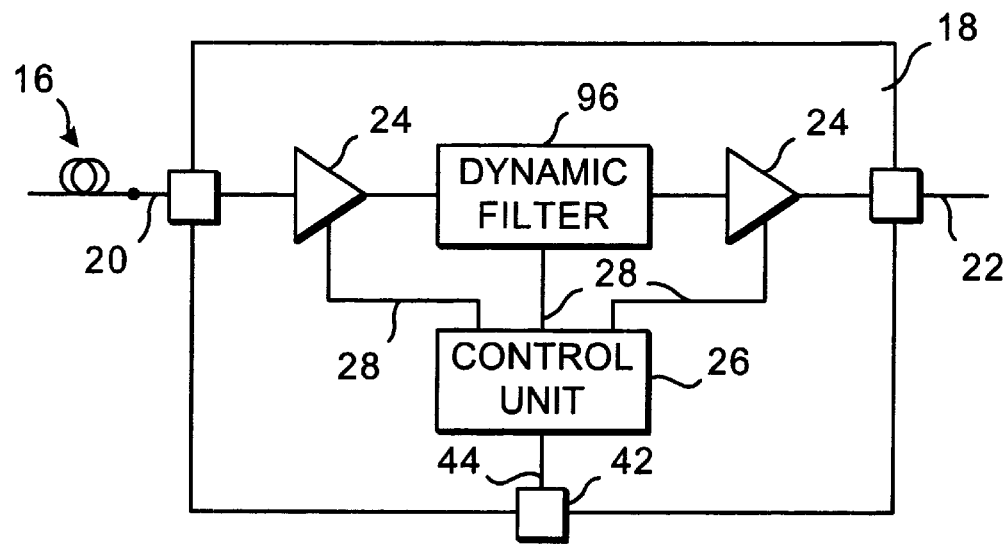
FIG. 9a is a schematic diagram of an illustrative optical amplifier with a dynamic filter in accordance with the present invention

Amplifiers with dynamic spectral filters may be upgraded to handle additional bandwidth or to add Raman pumping capabilities for supporting distributed Raman pumping. An illustrative amplifier 18 with a dynamic filter 96 is shown in FIG. 9*a*. Dynamic filter 96 and gain stages 24 may be controlled by control unit 26 using paths 28. The transmission spectrum of dynamic filter 96 may be adjusted in real time by control unit 26 in response to local optical channel monitoring or external spectral information received from an optical monitor in the system. A network management system may provide amplifier 18 with information on a desired gain or output power spectrum that amplifier 18 is to produce. Control unit 26 may adjust filter 96 based on the information on the current spectrum of amplifier 18 that is received from the optical channel monitor and based on the information on the desired spectrum for amplifier 18. Although the example of FIG. 9*a* shows a dynamic filter 96 that is operating in transmission, dynamic filters may be operated in reflection. When operated in reflection, a circulator may be used to direct light-to be filtered into the filter and to direct reflected light from the filter back into the fiber path of the amplifier.

Figure 9B:
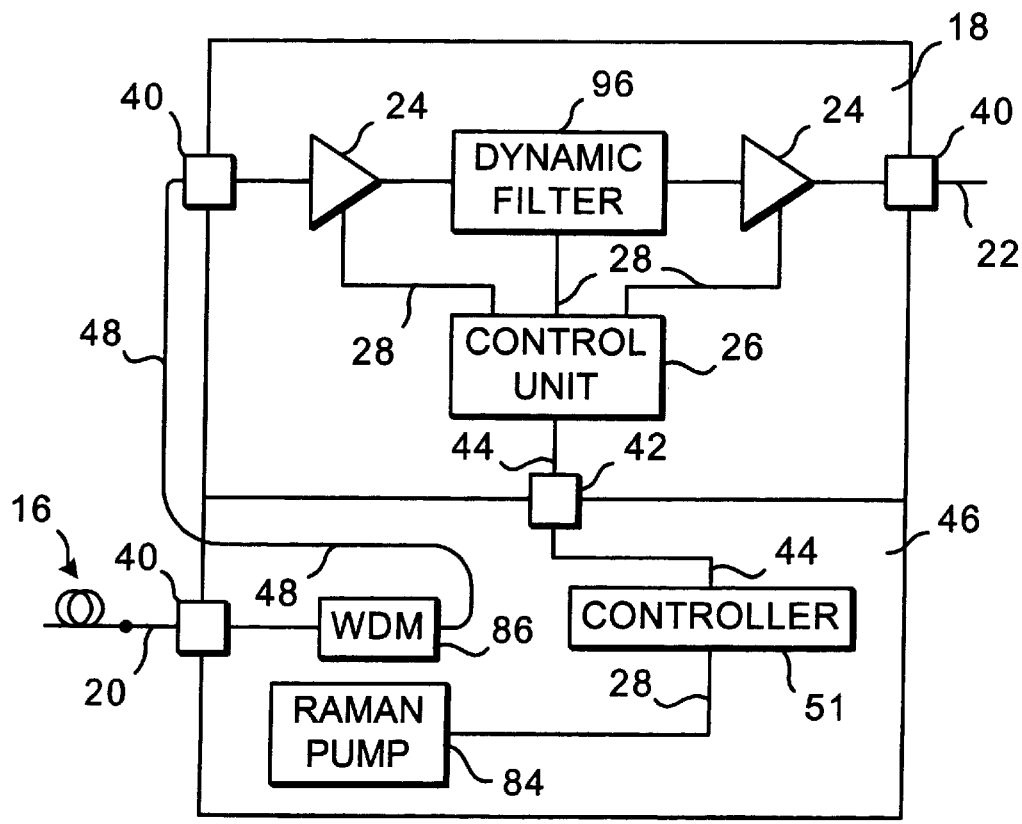
FIG. 9b is a schematic diagram of the illustrative optical amplifier of FIG. 9a and an upgrade module in accordance with the present invention.

As shown in FIG. 9*b*, an upgrade module 46 may be used to upgrade amplifier 18 to add Raman pump capabilities. Module 46 may include a Raman pump 84 and a pump coupler 86 for coupling Raman pump light into fiber 16. The data signal output of coupler 86 may be routed back to the input of amplifier 18 using fiber path 48. Controller 51 may be interconnected with control unit 26 using paths 44 and connector 42 and may be interconnected with Raman pump 84 using path 28. When Raman gain is added to span 16 by Raman pump 84, control unit 26 may be used to adjust the transmission spectrum of dynamic filter 96 to maintain the desired spectral characteristics of the amplifier (e.g., to maintain a flat gain spectrum or other suitable gain spectrum even as the input power to the first stage 24 is increased due to the Raman gain). Control unit 26 may control the operation of Raman pump 84 using controller 51 or any other suitable arrangement.

An amplifier that includes a Raman pump for pumping a preceding fiber span 16 to create distributed Raman gain may be upgraded with a module 46 that increases the optical bandwidth handled by the amplifier. For example, a C-band amplifier with a distributed Raman preamplifier stage may be upgraded to add L-band amplifier stages. If the initial Raman preamplifier stage for the C-band amplifier covers only the C-band, additional Raman pumps may also be added to provide distributed Raman gain in the L-band.

Figure 10A:
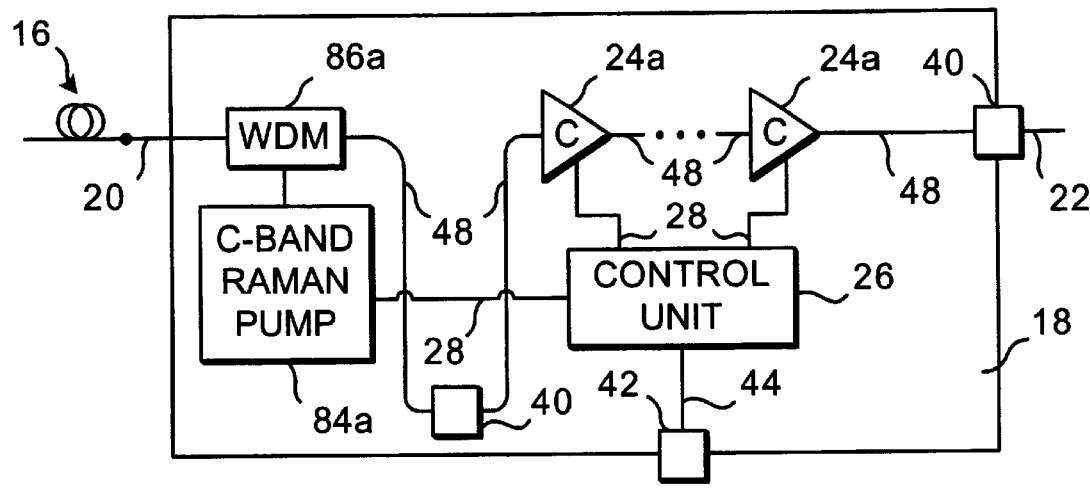
FIG. 10a is a schematic diagram of an illustrative optical amplifier having Raman amplifier capabilities in accordance with the present invention.
Figure 10B:
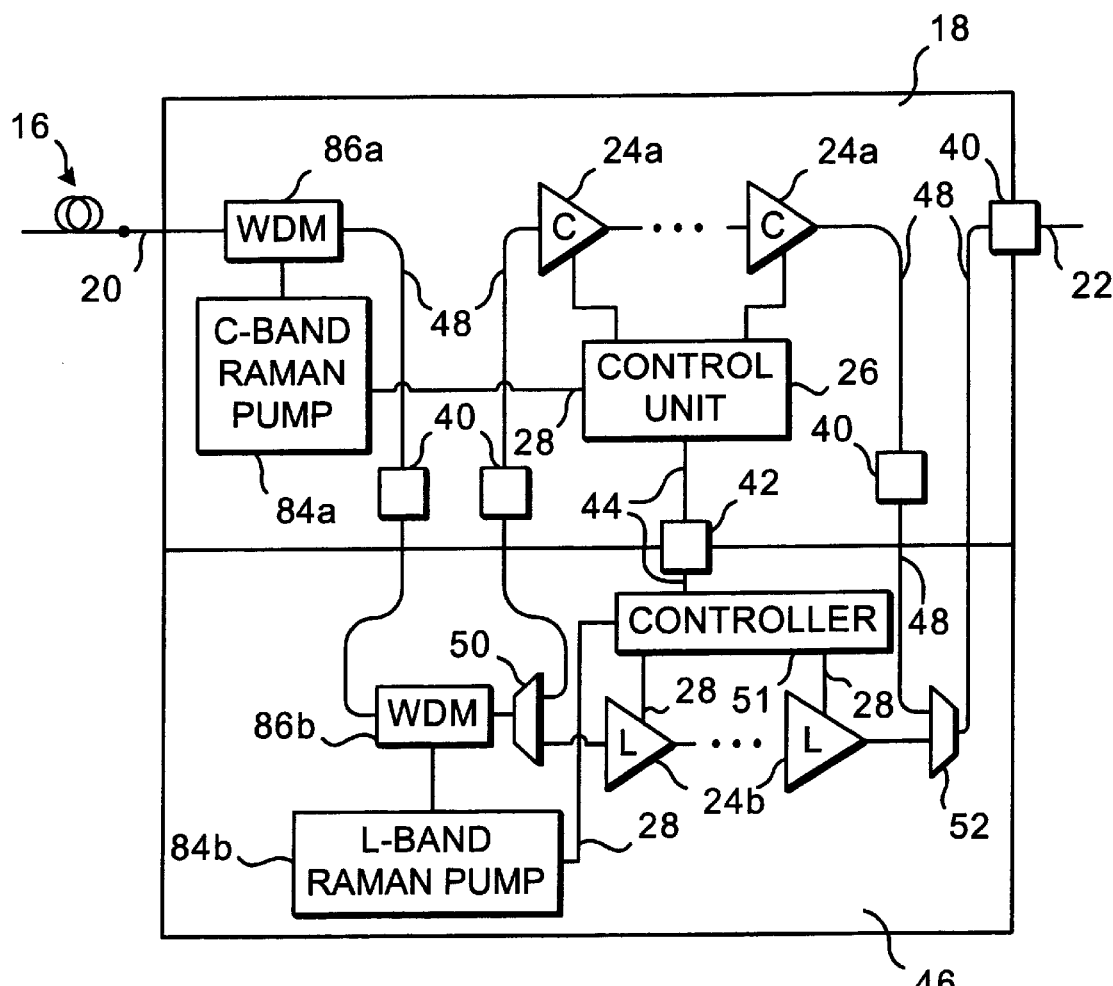
FIG. 10b is a schematic diagram of the illustrative optical amplifier of FIG. 10a with an upgrade module in accordance with the present invention.

An illustrative arrangement in which a C-band amplifier 18 with a Raman pump section is upgraded is shown in FIGS. 10*a* and 10*b*. In amplifier 18 of FIG. 10*a*, control unit 26 may control C-band Raman pump 84*a* using electrical path 28. Pump 84*a* may include one or more laser diodes or other suitable light sources for optically pumping the preceding transmission fiber span 16 connected to input 20. Light from pump 84*a* may be coupled into fiber span 16 using coupler 86*a*. A connector 40 may be provided between coupler 86*a* and the first C-band amplifier stage 24*a* to allow later installation of additional Raman pumps during an upgrade. C-band gain stages 24*a* may be used to amplify optical signals in the C-band. Control unit 26 may control the operation of C-band Raman pump 84*a* and one or more gain stages such as gain stages 24*a* using paths 28.

As shown in FIG. 10*b*, an upgrade module 46 may be added to amplifier 18 to provide additional optical bandwidth (e.g., L-band coverage). Upgrade module 46 may have a controller 51 that communicates with control unit 26 over paths 44 and connector 42. Control unit 26 may provide commands or other information to controller 51 over paths 44. Controller 51 may control the operation of L-band stages 24*b* over paths 28.

The L-band gain stages such as stages 24*b* may be used to provide amplification in the L-band. Demultiplexer 50 and multiplexer 52 may be used to divide incoming light into respective C-band and L-band optical paths and to recombine the associated light that has been amplified by C-band gains stages 24*a* and L-band gain stages 24*b* into a single fiber path connected to output 22. In the example of FIGS. 10*a* and 10*b*, demultiplexer 50 and multiplexer 52 are included in module 46. If desired, demultiplexer 50 and multiplexer 52 may be included in amplifier 18.

As shown in FIG. 10*b*, module 46 may have L-band Raman pump 84*b*. Light from L-band Raman pump 84*b* may be coupled into the fiber span 16 that is connected to input 20 using couplers 86*b* and 86*a*. Raman pump 84*b* may include one or more diode lasers or other suitable sources of pump light. The pump light produced by pump 84*a* of FIG. 10*a* may have wavelengths suitable for producing C-band gain. For example, pumps may be used that provide light at pump wavelengths that are about 50–100 nm (about 13 THz—a Stokes shift) below the C-band. Similarly, the pump light produced by pump 84*b* of FIG. 10*b* may have wavelengths suitable for producing L-band gain. Because the L-band lies about 50 nm above the C-band, the L-band pump 84*b* may provide light at wavelengths that are about 50 nm longer than the C-band Raman pump 84*a*.

The crossover wavelength of wavelength-division-multiplexing coupler 86*a* is preferably selected so that coupler 86*a* does not block pump light from pump 84*b* when module 46 is used to upgrade amplifier 18. In particular, the crossover wavelength of coupler 86*a* may be selected so that both pump light from C-band pump 84*a* and pump light from L-band pump 84*b* passes through coupler 86*a* towards input 20 and the associated span of transmission fiber 16. In both amplifier 18 of FIG. 10*a* and the combined amplifier formed by amplifier 18 and upgrade module 46 of FIG. 10*b*, couplers 86*a* and 86*b* allow all of the C-band and L-band input signals that are provided to input fiber 20 to be provided to their respective amplifier gain stages 24*a* and 24*b*.

Pump 84*a* may include three diode laser sources (for example) that produce pump light at 1433 nm, 1445 nm, and 1457 nm. These wavelengths may be used to produce Raman gain in the C-band. Pump 84*b* may include three diode laser sources (for example) that produce pump light at 1472, 1484, and 1496. These wavelengths may be used to produce Raman gain in the L-band.

An illustrative crossover wavelength for coupler 86*a* is about 1466 nm, which lies about midway between the longest C-band Raman pump wavelength produced by pump 84*a* and the shortest Raman pump wavelength produced by pump 84*b*. With this crossover wavelength, pump coupler 86*a* may be used to simultaneously couple Raman pump light from pump 84*a* into fiber span 16 and to allow Raman pump light from pump 84*b* to pass through pump coupler 86*a* to span 16. C-band and L-band signals have wavelengths longer than 1466 nm, so C-band and L-band signals from fiber 16 pass through coupler 86*a*.

An illustrative crossover wavelength for pump coupler 86*b* is about 1512 nm. This wavelength lies about midway between the longest L-band Raman pump wavelength produced by pump 84*b* and the shortest C-band data signal. With this crossover wavelength, pump coupler 86*b* may direct pump light for the L-band from pump 84b towards coupler 86a and may allow C-band and L-band data signals to pass through coupler 86b in the forwards direction towards demultiplexer 50.

Figure 11:
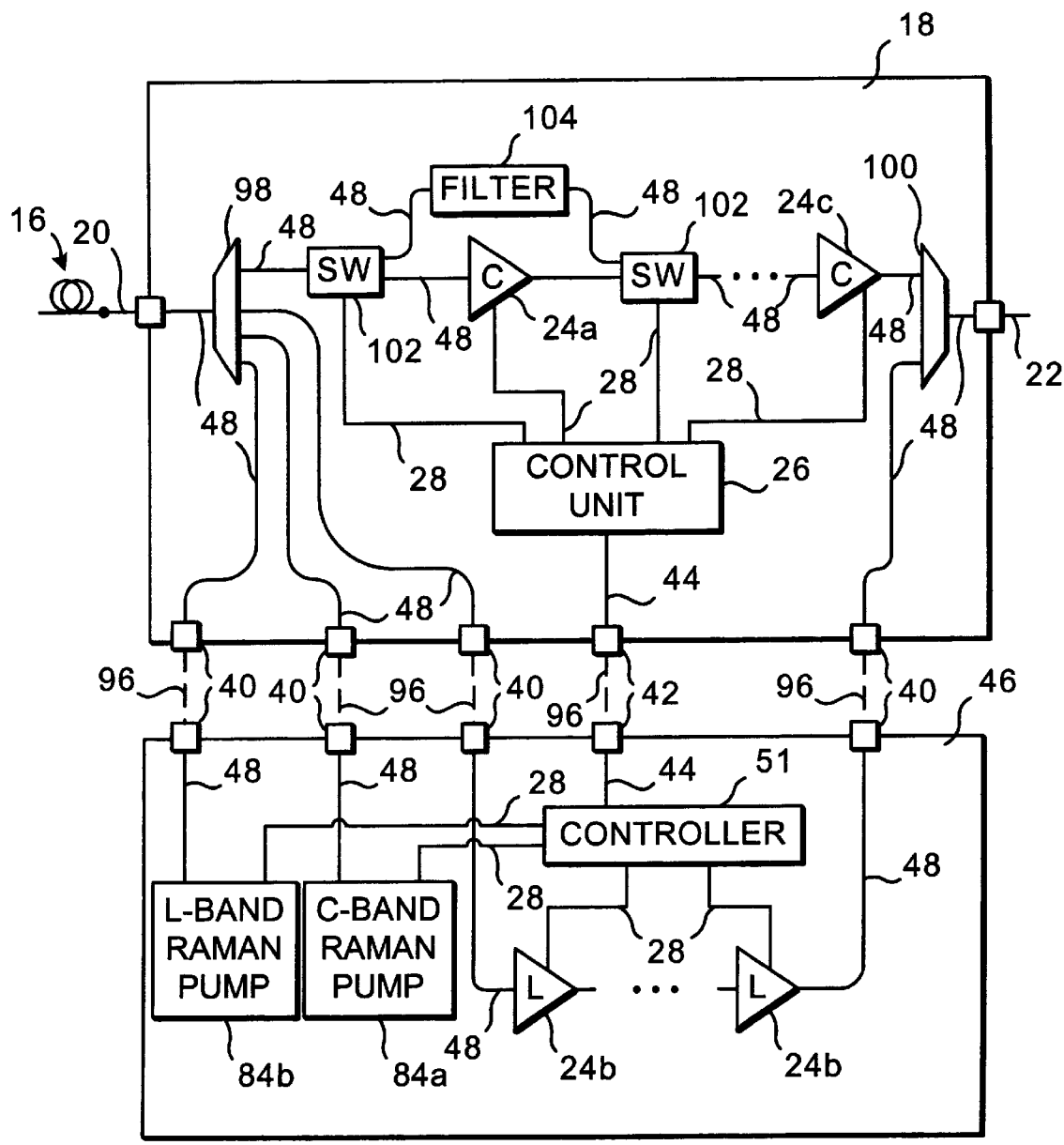
FIG. 11 is a schematic diagram of an illustrative optical amplifier and an illustrative associated upgrade module for adding Raman amplification capabilities and additional bandwidth in accordance in the present invention.

Amplifiers 18 and upgrade modules 46 may be configured to be upgraded in the field without disrupting the normal flow of data traffic through the amplifier 18. This type of "hot" upgrade may be particularly useful in systems in which possibly prolonged disruptions during the upgrade process are not acceptable. An amplifier 18 and upgrade module 46 that may be used to provide a hot upgrade for amplifier 18 are shown in FIG. 11. Amplifier 18 may be used to provide optical amplification in the C-band using C-band erbium-doped-fiber amplifier gain stages 24a and 24c. Gain stages 24a and 24c may be controlled by control unit 26 over paths 28. When upgrade module 46 is used to upgrade amplifier 18, control unit 26 may communicate with controller 51 over paths 44 using connectors 42.

As shown by dotted lines 96, amplifier 18 and upgrade module 46 may be provided with mating optical connectors 40. This arrangement is merely illustrative. Fiber splices, connectors 40 that are not mounted on the housing of amplifier 18 or module 46, or any other suitable interconnection arrangement may be used to optically interconnect amplifier 18 and module 46.

Amplifier 18 may have a demultiplexer 98 and a multiplexer 100. Demultiplexer 98 may be, for example, an arrayed waveguide (AWG) device. Multiplexer 100 may be a wavelength-division-multiplexing coupler or other suitable optical multiplexer.

Demultiplexer 98 may be used to split input light from input 20 into a C-band path and an L-band path. Light in the C-band may be provided to C-band gain stage 24a for amplification by gain stages 24a and 24c. Light in the L-band may be directed along an appropriate fiber path 48 and, when module 46 is used, may be directed through L-band amplifier gain stages 24b. Light at the output of the last L-band amplifier gain stage 24b in module 46 may be directed back into amplifier 18. In amplifier 18, the L-band light from module 46 may be combined with the C-band light from the output of the last C-band gain stage 24c using multiplexer 100. The combined light may be provided to output 22 of amplifier 18.

Raman pump light for fiber span 16 may be provided by L-band Raman pump 84b and C-band Raman pump 84a. Pumps 84a and 84b may include one or more laser diode sources or other suitable sources of Raman pump light. The Raman pump light may be launched into fiber span 16 through demultiplexer 98. When used as a pump coupler in this way, demultiplexer 98 serves as a multiplexer for the backwards propagating pump light from pump 84b and pump 84a.

The pump light from pump 84b and 84a may produce Raman gain in fiber 16 that covers the C-band and the L-band. Because the Raman gain that is produced in span 16 increases the input power of the light provided to input 20 of amplifier 18, one or more gain stages such as gain stage 24a may be bypassed when module 46 is used.

Control unit 26 may be instructed when an upgrade is being performed. During normal operation, before an upgrade, control unit 26 may direct switches 102 to route incoming signals from demultiplexer 98 through gain stage 24a. When amplifier 18 has been upgraded with module 46, control unit 26 may direct switches 102 to route incoming light around gain stage 24a. For example, control unit 26 may direct switches 102 to route light through a spectral filter such as filter 104. The filter 104 may be used to help maintain a desired shape for the gain of amplifier 18, even when Raman preamplification is being used in place of gain stage 24a. The disruption to the data traffic handled by amplifier 18 when switches 102 are used to bypass stage 24a may be relatively brief and therefore may not seriously disrupt the data carried on link 10 during the upgrade process.

If desired, the hot upgrade features of FIG. 11 may be used in the amplifiers and upgrade modules shown in the other drawings. Hot upgrades may be provided to add bandwidth (e.g., to add S-band or L-band amplifier stages to a C-band amplifier, to add C-band capabilities to an amplifier without C-band coverage, etc.). Hot upgrades may also be provided to add Raman amplification capabilities (e.g., in the form of an upgrade Raman pump module for pumping transmission fiber to produce a distributed Raman amplifier stage). Multiple upgrades may be performed on a single amplifier using multiple modules.

Moreover, the features described in connection with one particular illustrative amplifier or upgrade module example may generally be used in combination with the features described in connection with other amplifier and upgrade module examples. To avoid repetition, most features have been presented in the context of a particular illustrative amplifier and upgrade module configuration.

Figure 12A:
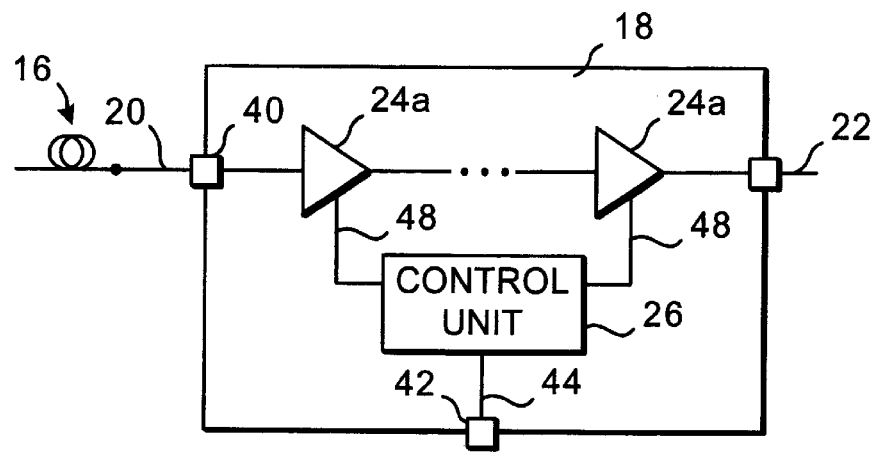
FIG. 12a is a schematic diagram of an illustrative optical amplifier in accordance with the present invention.
Figure 12B:
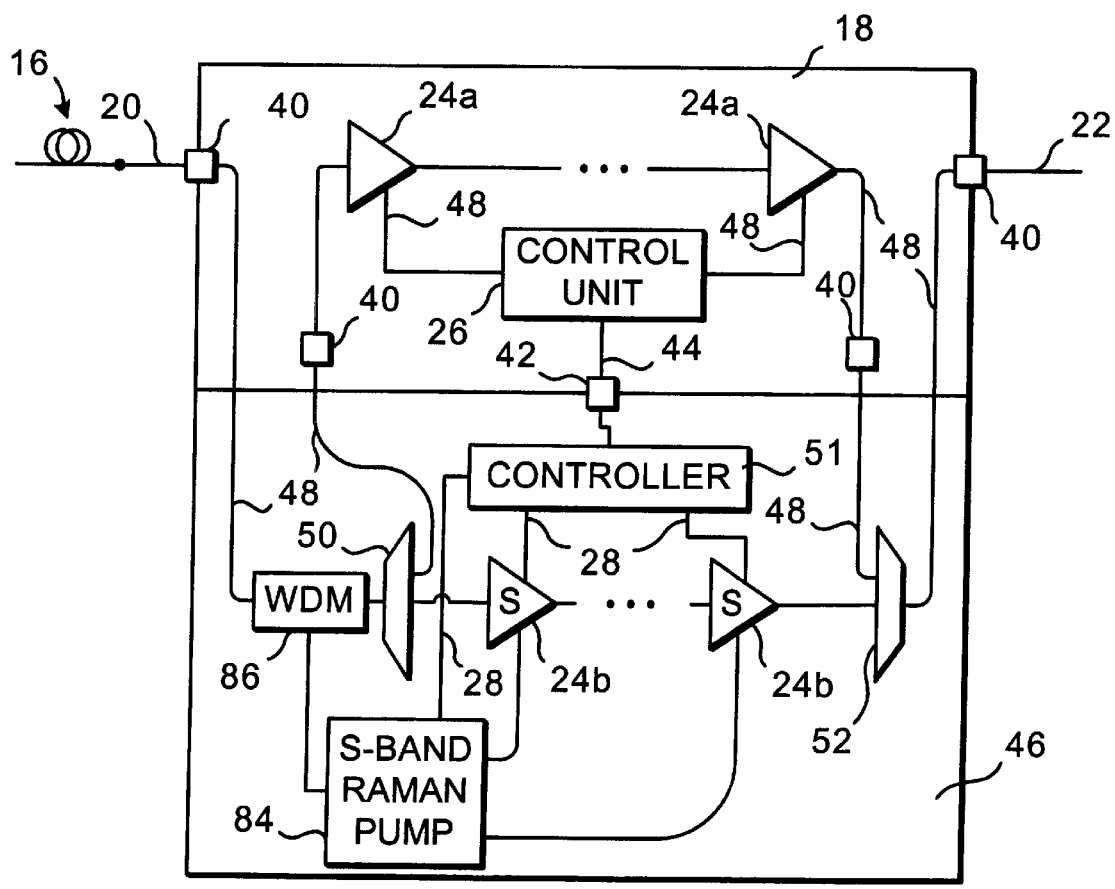
FIG. 12b is a schematic diagram of the illustrative optical amplifier of FIG. 12a with an upgrade module for adding additional bandwidth in accordance with the present invention.

An illustrative upgrade arrangement for an amplifier 18 such as an amplifier without a Raman pump section is shown in FIGS. 12a and 12b. Amplifier 18 of FIGS. 12a and 12b may be a C-band amplifier, an L-band amplifier, or may operate in any other suitable band. In the example of FIGS. 12a and 12b, amplifier 18 is shown as being upgraded with a module 46 that provides Raman amplification in the S-band. This is, however, merely illustrative. The Raman amplification added by module 46 may be provided in any suitable band.

In amplifier 18 of FIG. 12a, control unit 26 may control gain stages 24a (e.g., C-band or L-band gain stages) using electrical paths 48. When it is desired to add additional bandwidth capabilities to amplifier 18, module 46 may be connected to amplifier 18, as shown in FIG. 12b. Module 46 may include one or more S-band gain stages 24b. Each gain stage 24b may have one or more coils of fiber that is optically-pumped to provide Raman gain in the S-band. Pump light may be provided by S-band Raman pump 84 or by pumps associated with stages 24b that are separate from pump 84. The Raman-pumped fiber coils in gain stages 24b may include dispersion-compensating fiber or other small-core-area fiber or any other suitable fiber.

Span 16 may be pumped with S-band Raman pump 84. Pump light from pump 84 may be coupled into fiber span 16 using wavelength-division-multiplexing coupler 86. Demultiplexer 50 and multiplexer 52 may be used to route optical signals through amplifier 18 and upgrade module 46 by wavelength.

If desired, gain stages 24b may be omitted and Raman amplification may be provided by using only S-band Raman pump 84 to pump fiber 16 in a distributed Raman arrangement.

Pump 84 may include one or more laser diodes or other suitable sources of Raman pump light that provide Raman gain in the S-band when used to pump fiber. Pump 84 and stages 24b may be controlled by controller 51 using paths 28.

It will be understood that the foregoing is merely illustrative of the principles of this invention, and that various modifications can be made by those skilled in the art without departing from the scope and spirit of the invention.

What is claimed is:

1. An upgrade module for extending the bandwidth of a fiber-optic communications network optical amplifier that has at least one amplifier gain stage that amplifies light in a first wavelength band, wherein the at least one amplifier gain stage has an input and an output, wherein the amplifier has a fiber input and a fiber output, wherein optical connectors are used to connect the amplifier fiber input to the amplifier gain stage input and the amplifier gain stage output to the amplifier fiber output, and wherein operation of the amplifier is controlled using a control unit that is electrically connected to the at least one amplifier gain stage and that is electrically connected to an electrical connector, comprising:

- a controller that is electrically connected to the control unit through the electrical connector when the upgrade module is used to upgrade the amplifier;
- at least one upgrade module gain stage that amplifies light in a second wavelength band that is different than the first wavelength band;
- an optical demultiplexer that receives light from the fiber input when the upgrade module is used to upgrade the amplifier, that directs light in the first wavelength band to the at least one amplifier gain stage, and that directs light in the second wavelength band to the at least one upgrade module gain stage; and
- an optical multiplexer that directs light from the at least one amplifier gain stage and the at least one upgrade module gain stage to the fiber output when the upgrade module is used to upgrade the amplifier, wherein at least some of the optical connectors are used in connecting the upgrade module to the amplifier when the amplifier is upgraded with the upgrade module to extend the bandwidth of the amplifier into the second wavelength band from the first wavelength band.

2. The upgrade module defined in claim 1 wherein the optical connectors comprise reusable connectors.

3. The upgrade module defined in claim 1 wherein the amplifier has a housing and wherein the optical connectors comprise bulkhead connectors mounted to the amplifier housing.

4. The upgrade module defined in claim 1 wherein the first wavelength band comprises the C-band and the second wavelength band comprises the L-band.

5. The upgrade module defined in claim 1 wherein the controller is configured to communicate with the control unit using RS-232 communications.

6. The upgrade module defined in claim 1 wherein the controller is configured to communicate with the control unit using digital communications.

7. The upgrade module defined in claim 1 wherein the demultiplexer includes a fiber Bragg grating.

8. An upgrade module for a fiber-optic communications network optical amplifier, wherein the amplifier has a first gain stage and at least one second gain stage that are used to amplify light, wherein the amplifier has an input and an output, wherein a span of transmission fiber is connected to the input when the amplifier is installed in a fiber-optic communications network, and wherein operation of the amplifier is controlled using a control unit that is electrically connected to the gain stages, comprising:

- a controller that communicates with the control unit;
- a Raman pump that produces pump light for optically pumping the span of transmission fiber; and
- a pump coupler that directs the pump light from the Raman pump to the span of transmission fiber when the upgrade module is used to upgrade the amplifier, wherein the pump coupler bypasses the first gain stage and directs data signals that are received from the transmission fiber span to the input of the at least one second gain stage when the amplifier is upgraded using the upgrade module.

9. The upgrade module defined in claim 8 further comprising a spectral filter that is connected between the pump coupler and the at least one second gain stage.

10. The upgrade module defined in claim 8 wherein the pump coupler comprises a wavelength-division-multiplexing coupler.

11. The upgrade module defined in claim 8 further comprising an electrical connector that is used to connect the controller to the control unit during upgrading with the upgrade module, wherein the controller is configured to support digital communications with the control unit, and wherein the controller controls the Raman pump based on the communications between the controller and the control unit.

12. An upgraded amplifier that has been formed by upgrading a given amplifier using an upgrade module that provides Raman amplification capabilities, comprising:

- a fiber input that is connected to a transmission fiber span when the amplifier is used to amplify optical signals in a fiber-optic communications network;
- a fiber output;
- at least first and second rare-earth-doped fiber gain stages;
- a control unit that controls the first and second rare-earth-doped fiber gain stages;
- a removable midstage module, wherein the removable midstage module is optically coupled between the first and second rare-earth-doped fiber gain stages;
- a Raman pump that produces pump light for the transmission fiber span;
- a controller that controls the Raman pump and that is electrically connected to the control unit; and
- a wavelength-division multiplexing coupler that directs pump light from the Raman pump to the transmission fiber span and that directs light from the transmission fiber span into the first gain stage, wherein the first and second gain stages, midstage module, and control unit were part of the given amplifier and wherein the Raman pump and controller were part of the upgrade module prior to upgrading the given amplifier with the upgrade module to form the upgraded amplifier.

13. The upgraded amplifier defined in claim 12 wherein the midstage module comprises a filter.

14. An upgrade module for a fiber-optic communications network optical amplifier that has at least first and second gain stages that are used to amplify light, wherein the amplifier has an input and an output, wherein a span of transmission fiber is connected to the input when the amplifier is installed in a fiber-optic communications link, and wherein operation of the amplifier is controlled using a control unit that is electrically connected to the gain stages, comprising:

- a controller that communicates with the control unit when the optical amplifier is upgraded with the upgrade module;
- a Raman pump that produces pump light for optically pumping the span of transmission fiber; and
- a pump coupler that directs the pump light from the Raman pump to the span of transmission fiber when the upgrade module is connected to the amplifier; and a dynamic filter that is optically coupled between the first and second gain stages when the optical amplifier is upgraded with the upgrade module, wherein the Raman pump and dynamic filter are controlled using the controller.

15. An upgrade module for a fiber-optic communications network optical amplifier that has at least first and second gain stages that are used to amplify light and a dynamic spectral filter between the first and second gain stages, wherein the amplifier has an input and an output, wherein a span of transmission fiber is connected to the input when the amplifier is installed in a fiber-optic communications link, and wherein the first and second gain stages and dynamic filter in the amplifier are controlled using a control unit that is electrically connected to the gain stages, comprising:

a controller that communicates with the control unit when the optical amplifier is upgraded with the upgrade module;

a Raman pump that produces pump light for optically pumping the span of transmission fiber; and a pump coupler that directs the pump light from the Raman pump to the span of transmission fiber when the upgrade module is used to upgrade the amplifier, wherein the dynamic filter is adjusted when the amplifier is upgraded with the upgrade module to accommodate an increase in input power that results from Raman pumping the span of transmission fiber with the Raman pump.

16. An upgraded amplifier that has been formed by upgrading a given amplifier using an upgrade module, wherein the given amplifier has Raman amplification capabilities and amplifies light in a first wavelength band and wherein the upgrade module has Raman amplification capabilities and amplifies light in a second wavelength band that is different than the first wavelength band, the upgraded amplifier comprising:

a fiber input connected to a transmission fiber span when the upgraded amplifier is used to amplify optical signals in a fiber-optic communications network;

a fiber output;

at least one first gain stage that provides optical gain in the first wavelength band;

at least one second gain stage that provides optical gain in the second wavelength band;

a first Raman pump that provides Raman pump light to the transmission fiber span to generate Raman gain in the first wavelength band;

a second Raman pump that provides Raman pump light to the transmission fiber span to generate Raman gain in the second wavelength band;

a control unit that is used in controlling the first gain stage and the first Raman pump; and a controller that is used in controlling the second gain stage and the second Raman pump, wherein the controller and control unit communicate when the given amplifier has been upgraded using the upgrade module, wherein the first gain stage, first Raman pump, and control unit were part of the given amplifier and wherein the second gain stage, second Raman pump, and controller were part of the upgrade module prior to upgrading the given amplifier with the upgrade module to form the upgraded amplifier.

17. The upgraded amplifier defined in claim 16 further comprising:

a demultiplexer that directs input light provided to the upgraded amplifier into separate paths that are associated respectively with the first and second gain stages;

a first wavelength-division-multiplexing coupler that directs pump light from the first Raman pump to the transmission fiber span; and a second wavelength-division-multiplexing coupler that directs pump light from the second Raman pump to the transmission fiber span, wherein the first and second wavelength-division-multiplexing couplers are connected in series between the fiber input and the demultiplexer, and wherein the first wavelength-division-multiplexing coupler has a crossover wavelength that allows the pump light from the second Raman pump to pass through the first wavelength-division-multiplexing coupler to the transmission fiber span, wherein the first wavelength-division-multiplexing coupler was part of the given amplifier and the second wavelength-division-multiplexing coupler and demultiplexer were part of the upgrade module prior to upgrading the given amplifier with the upgrade module to form the upgraded amplifier.

18. An upgrade module for a fiber-optic communications network optical amplifier that has at least first and second rare-earth-doped fiber gain stages that are used to amplify light in a first wavelength band, wherein the amplifier has an input and an output, wherein a span of transmission fiber is connected to the input when the amplifier is installed in a fiber-optic communications link, and wherein operation of the amplifier is controlled using a control unit that is electrically connected to the gain stages, comprising:

a controller that communicates with the control unit when the optical amplifier is upgraded with the upgrade module;

a Raman pump that produces pump light for optically pumping the span of transmission fiber; and a pump coupler that directs the pump light from the Raman pump to the span of transmission fiber when the upgrade module is connected to the amplifier; and at least one Raman-pumped gain stage that is controlled by the controller, wherein the Raman pump and gain stage operate in a second wavelength band that is different than the first wavelength band.

19. The upgrade module defined in claim 18 wherein the second wavelength band is the S-band.

* * * * *